United States Patent [19]
Perdomi et al.

[11] Patent Number: 6,010,772
[45] Date of Patent: *Jan. 4, 2000

[54] STRETCHABLE MULTILAYER FILMS

[75] Inventors: Gianni Perdomi, Ferrara; Claudio Cometto, Bologna; Emanuele Burgin, Zola Predosa, all of Italy

[73] Assignee: Montell Technology Company bv, Netherlands

[ * ] Notice: This patent is subject to a terminal disclaimer.

[21] Appl. No.: 08/747,913

[22] Filed: Nov. 12, 1996

[30] Foreign Application Priority Data

Nov. 14, 1995 [IT] Italy .................. MI95A2331

[51] Int. Cl.$^7$ ....................................... B32B 7/02
[52] U.S. Cl. .................. 428/212; 428/213; 428/218; 428/219; 428/336; 428/516; 525/240; 156/244.11
[58] Field of Search ..................... 428/516, 336, 428/218, 219, 213, 212; 525/240; 156/244.11

[56] References Cited

U.S. PATENT DOCUMENTS

| | | | |
|---|---|---|---|
| 4,218,339 | 8/1980 | Zucchini et al. | 502/111 |
| 4,472,520 | 9/1984 | Zucchini et al. | 502/104 |
| 4,521,566 | 6/1985 | Galli | 525/247 |
| 4,748,221 | 5/1988 | Collomb et al. | 526/153 |
| 4,803,251 | 2/1989 | Goode et al. | 526/59 |
| 5,407,732 | 4/1995 | Dokurno | 428/213 |
| 5,419,934 | 5/1995 | Wilson | 428/34.9 |

FOREIGN PATENT DOCUMENTS

| | | |
|---|---|---|
| 0395083 | 10/1990 | European Pat. Off. . |
| 395083 | 10/1990 | European Pat. Off. . |
| 400333 | 12/1990 | European Pat. Off. . |
| 472-946 | 3/1992 | European Pat. Off. . |
| 0472946 | 4/1992 | European Pat. Off. . |
| 553805 | 8/1993 | European Pat. Off. . |
| 553806 | 8/1993 | European Pat. Off. . |
| WO 93/03078 | 2/1993 | WIPO . |
| WO 95/20009 | 7/1995 | WIPO . |

*Primary Examiner*—Leszek Kiliman
*Attorney, Agent, or Firm*—Bryan Cave LLP

[57] ABSTRACT

Stretchable multilayer films in which at least one layer (A) thereof comprises a copolymer (I) of ethylene with one or more α-olefins $CH_2=CHR$, having a density of between 0.88 and 0.945 g/cm$^3$, a melt index of from 0.1 to 10 g/10' and containing up to 20 mol % of α-olefin $CH_2=CHR$ (LLDPE), and at least one layer (B) comprises a heterophasic polyolefin composition having:

(a) 20–100 parts by weight of a fraction which is insoluble in xylene at room temperature, comprising a propylene homopolymer or a copolymer of propylene with ethylene and/or another α-olefin $CH_2=CHR'$, this fraction containing more than 85% by weight of units derived from propylene; and (b) 30–80 parts by weight of a fraction which is soluble in xylene at room temperature, comprising an amorphous copolymer of ethylene with propylene and/or another α-olefin $CH_2=CHR'$, this fraction optionally containing smaller proportions of a diene and containing more than 15% by weight of units derived from ethylene.

33 Claims, No Drawings

STRETCHABLE MULTILAYER FILMS

STRETCHABLE MULTILAYER FILMS

The present invention relates to stretchable multilayer films which have improved mechanical properties. In particular, the invention relates to stretchable multilayer films in which at least one layer (A) comprises a linear low density polyethylene (LLDPE) and at least one layer (B) comprises a heterophasic polyolefin composition having a fraction which is insoluble in xylene at room temperature and a fraction which is soluble in xylene at room temperature.

The use of stretchable films in the field of wrapping and packaging goods constitutes an application of significant commercial importance. The reason for this is that wrappings and packaging made of polymer films allow the goods to be assembled in stable units and in uniform shapes, thereby enabling their transportation to be rationalized and consequently made more economical. Given the large variety of types of goods to be packaged and wrapped, many different properties are required of these films, depending on, among other things, the different packaging techniques used. Particularly important requirements for affording wide applicability are especially the mechanical properties, among which the puncture strength is particularly important. Indeed, this property needs to have values such that materials with sharp corners can be packaged without tearing of the films taking place. It is moreover necessary for the films to be as economical as possible so that their cost does not have a significant impact on the packaged product sold to the public. One of the solutions used for the purposes of reducing the costs is to pre-draw the films before packaging. In this way, the length of the film is increased, thereby reducing its thickness and, consequently, its cost relative to the packaged product. The upper limit of the drawing ratio is imposed by the fall in the mechanical performance of the film itself once it has been pre-drawn. It is therefore particularly important to have available films capable of retaining good mechanical properties even after pre-drawing.

Many different polymers have been used in the past for the purposes of obtaining films capable of satisfying these requirements. Recently, the use of LLDPE has constituted an important development in this field, in view of its characteristics in terms of mechanical properties and processability. Nevertheless, films exclusively comprising LLDPE do not possess an entirely satisfactory combination of properties. Moreover, the LLDPEs which give the best performance are those modified with 1-hexene or 1-octene, which have substantially higher production costs than LLDPEs modified with butene. Various solutions have therefore been proposed, including mono- or multilayer films obtained from compositions comprising LLDPE mixed with other components. U.S. Pat. No. 5,419,934 describes a stretchable multilayer film comprising two outer layers and one inner layer. The inner layer comprises a composition consisting of LLDPE in an amount ranging from 5 to 15% and a polymer selected from propylene homopolymer and copolymers, or mixtures thereof, in amounts of between 85 and 95%.

The two outer layers comprise an LLDPE which has properties different from those of the LLDPE used in the inner layer, optionally mixed with other components such as EVA or LDPE.

However, the combination of mechanical properties displayed by the films of the prior art is not entirely satisfactory.

An improvement in the optical and mechanical properties of the films is obtained with the polymer compositions described in international patent application WO 95/20009. That application describes polyolefin compositions of high processability, comprising: (a) from 75 to 95% by weight of a copolymer of ethylene with an α-olefin $CH_2=CHR$, where R is an alkyl radical having from 1 to 10 carbon atoms, the said ethylene copolymer containing up to 20 mol % of α-olefin $CH_2=CHR$; and (b) from 5 to 25% by weight of a copolymer of propylene with ethylene and with at least one α-olefin $CH_2=CHR^I$, where $R^I$ is an alkyl radical having from 2 to 10 carbon atoms. The copolymer (b) contains from 80 to 98% by weight of propylene, from 1 to 10% by weight of ethylene and from 1 to 10% by weight of α-olefin $CH_2=CHR^I$ and is characterized by an insolubility in xylene of greater than 70%. However, the films of the prior art still do not possess satisfactory mechanical properties, in particular in terms of puncture strength, and moreover do not retain these properties sufficiently after they have undergone pre-drawing.

There is therefore a need for polymer films capable of satisfying the requirements for wide-scale applicability. It has now been found, surprisingly, that stretchable multilayer films in which at least one layer (A) thereof comprises an LLDPE, and in which at least one layer (B) thereof comprises a polymer composition of defined properties, possess an excellent combination of mechanical properties and are therefore capable of wide-scale use. It has been found, entirely unexpectedly, that the said films, even when obtained from LLDPE modified with 1-butene, not only display better mechanical properties and better processability when compared with conventional LLDPE-based films modified with 1-butene, but also display a better combination of mechanical properties than that shown by films obtained from LLDPE modified with 1-octene. In particular, they have better puncture strength values and exhibit retention of the said mechanical and processability properties after pre-drawing.

The stretchable multilayer films of the present invention are characterized in that at least one layer (A) thereof comprises a copolymer (i) of ethylene with one or more α-olefins $CH_2=CHR$, where R is an alkyl radical having from 1 to 10 carbon atoms, this copolymer having a density of between 0.88 and 0.945 g/cm³, a melt index of from 0.1 to 10 g/10' and containing up to 20 mol % of α-olefin $CH_2=CHR$, and at least one layer (B) comprises a heterophasic polyolefin composition having:

(a) 20–100 parts by weight of a fraction which is insoluble in xylene at room temperature, comprising a propylene homopolymer or a copolymer of propylene with ethylene and/or another α-olefin $CH_2=CHR^I$, where $R^I$ is an alkyl radical having 2–10 carbon atoms, this fraction containing more than 85% by weight of units derived from propylene; and (b) 30–80 parts by weight of a fraction which is soluble in xylene at room temperature, comprising an amorphous copolymer of ethylene with propylene and/or another α-olefin $CH_2=CHR^I$, where $R^I$ has the meaning described above, this fraction optionally containing smaller proportions of a diene and containing more than 15% by weight of units derived from ethylene.

The melt index (determined according to ASTM method D-1238, condition E) of the copolymer (i) has values preferably of between 0.2 and 5 g/10 minutes, more preferably of between 0.2 and 3 g/10 minutes.

The α-olefin $CH_2=CHR$ may be selected, for example, from propylene, 1-butene, 1-hexene, 1-octene and 4-methyl-1-pentene; 1-butene or 1-hexene is preferably used. In the preparation of the component (i), the olefins $CH_2=CHR$ may also be used mixed together.

The copolymer (i) is prepared by copolymerization of ethylene with an α-olefin $CH_2$=CHR, in the presence of a catalyst of Ziegler-Natta type obtained by reaction of an organometallic compound of a metal from groups II and III of the Periodic Table of the Elements with a catalytic component comprising a compound of a transition metal belonging to groups IV, V or VI of the Periodic Table of the Elements. The transition metal compound is preferably supported on a solid support comprising a magnesium halide in activated form. Examples of catalysts which can be used in the preparation of the copolymer (i) are described in U.S. Pat. No. 4,218,339 and U.S. Pat. No. 4,472,520, the description of which is included herein by way of reference. The catalysts can also be prepared according to the methods described in U.S. Pat. Nos. 4,748,221 and 4,803,251.

Other examples of catalysts are described in patent applications EP-A-395,083, EP-A-553,805 and EP-A-553,806.

The heterophasic polyolefin compositions used in layer (B) can conveniently be prepared by sequential polymerization working in at least two stages; in a first stage, a crystalline propylene homopolymer or copolymer having an isotactic index of greater than 85 is prepared, and, in a second stage, mixtures of ethylene, propylene and/or an α-olefin $CH_2$=$CHR^I$ are polymerized to give a predominantly amorphous copolymer.

The fraction (a) which is insoluble in xylene preferably comprises a copolymer of propylene, preferably with ethylene, this fraction containing more than 90% by weight of units derived from propylene. The amount of fraction (b) which is soluble in xylene is preferably greater than 30% of the total weight of (a)+(b), more preferably greater than 45%. The intrinsic viscosity of the fraction (b) is preferably between 1.5 and 4 dl/g.

Examples of heterophasic compositions and methods for preparing them are described in U.S. Pat. No. 4,521,566, EP-A-400,333 and EP-A-472,946, the description of which is incorporated herein by way of reference. The α-olefin $CH_2$=$CHR^I$ may be, for example, 1-butene, 1-hexene, 1-octene, 4-methyl-1-pentene or a mixture thereof; it is preferably 1-butene or 1-hexene.

The layer (A) of the films according to the present invention preferably comprises the following components:

(i) from 80 to 100 parts by weight of a copolymer of ethylene with one or more α-olefins $CH_2$=CHR, where R is an alkyl radical having from 1 to 10 carbon atoms, this copolymer having a density of between 0.88 and 0.945 g/cm$^3$, a melt index of from 0.1 to 10 g/10' and containing up to 20 mol % of α-olefin $CH_2$=CHR, and (ii) from 5 to 30 parts by weight of a copolymer of propylene with ethylene and/or one or more α-olefins $CH_2$=$CHR^I$, where $R^I$ is a hydrocarbon radical having from 2 to 10 carbon atoms, the said propylene copolymer containing from 60 to 98% by weight of propylene and having an insolubility in xylene of greater than 70%.

The copolymer (i) is preferably present in amounts of between 85 and 95 parts by weight and has a density preferably of between 0.89 and 0.94 g/cm$^3$. These values are more preferably between 0.90 and 0.935.

The copolymer (ii) may be, for example, a copolymer of propylene with ethylene or a copolymer of propylene with 1-butene. It is preferably a terpolymer of propylene with ethylene and an α-olefin $CH_2$=$CHR^I$. In this case, its propylene content is between 85 and 96% by weight, its ethylene content is between 2 and 8% by weight and its α-olefin $CH_2$=$CHR^I$ content is between 2 and 7% by weight.

The content of the various components is determined by IR and NMR analysis.

The α-olefin $CH_2$=$CHR^I$ may be selected, for example, from 1-butene, 1-hexene, 1-octene and 4-methyl-1-pentene, and is preferably 1-butene or 1-hexene.

The high insolubility in xylene is indicative of a stereoregular structure of the propylene units and of homogeneous distribution of the ethylene units and of the α-olefin $CH_2$=$CHR^I$ in the polymer chains.

The insolubility of xylene, determined according to the method described below, is preferably greater than 75%, more preferably greater than 85%. The heat of fusion of the copolymer (ii) is generally greater than 50 J/g, preferably greater than 60 J/g, more preferably greater than 70 J/g. The melting point of the copolymer (ii) is below 140° C. and preferably between 120 and 140° C.

The crystalline index of the copolymer (ii) is generally greater than 50%.

The melt index (determined according to ASTM method D-1238, condition L) of the copolymer (ii) has values generally of between 5 and 1000, preferably of between 5 and 100, more preferably of between 5 and 30.

The copolymers according to the component (ii) can conveniently be prepared using a highly stereospecific catalyst, of the type described in patent application EP-A-395,083, the description of which is included herein by way of reference.

The component (ii) is preferably used in amounts of between 5 and 20 parts by weight.

The components (i) and (ii) of the present invention can be blended separately before being fed into the extruder by mixing the two components in the molten state, for example in a mixer with high mixing efficiency.

Preferably, a composition comprising components (i) and (ii) is prepared directly by polymerization working in at least two reactors in series in which, working in any order and using the same catalyst in the various reactors, copolymer (i) is synthesized in one of the reactors and copolymer (ii) is synthesized in the other. The polymerization is conveniently carried out in the gas phase using fluidized-bed reactors. Examples of products prepared according to this method are described in patent applications WO 93/03078 and WO 95/20009, the descriptions of which are incorporated herein by way of reference.

In one particular aspect of the invention, the layer (A) comprises not only the components (i) and (ii) but also the component (iii) which is made up of a low density polyethylene LDPE. The said low density polyethylene can be any LDPE known in the art. Generally, the said polymers are obtained by radical polymerization under high pressure and have a relative density of between 0.916 and 0.925 and a melt index of between 0.2 and 10 g/10'.

In a preferred aspect of the present invention, the heterophasic polyolefin composition present in layer (B) of the films according to the present invention comprises:

(a1) 10–50 parts by weight of at least one polymer selected from a propylene homopolymer having an isotactic index of greater than 80, and a copolymer of propylene with at least one comonomer selected from ethylene and α-olefins of formula $CH_2$=CHR where R is an alkyl radical containing from 2 to 8 carbon atoms, the said copolymer containing at least 85% by weight of units derived from propylene;

(a2) 5–20 parts by weight of a copolymer containing ethylene, this copolymer being insoluble in xylene at room temperature; and (b) 40–80 parts by weight of a copolymer containing 10–40% by weight of units derived from ethylene, 90–60% by weight of units derived from at least one comonomer selected from propylene and α-olefins of formula $CH_2=CHR^I$ where $R^I$ is an alkyl radical containing from 2 to 10 carbon atoms and 0–5% of units derived from a diene, the said copolymer being soluble in xylene at room temperature and having an intrinsic viscosity of between 1.5 and 4 dl/g;

where the total of the components (a2)+(b) is between 50 and 90% by weight relative to the heterophasic polyolefin composition, and the ratio of the amounts of the components (a2)/(b) by weight is less than 0.4.

Compositions of this type, together with the process for their preparation, are described in European patent application EP-A-472,946, the content of which is understood to be incorporated into the present description.

The multilayer films according to the present invention are preferably prepared by the known technology of film extrusion through a flat head. In particular, in the case of the present multilayer films, two or more parallel extruders, fed with the desired polyolefin compositions, convey the molten material to a flat collecting head provided with a slot from which the superimposed molten layers emerge. The said layers are then extruded onto a rotating cylinder with a cooling facility (chill roll) which allows solidification of the extrudate with formation of the polymer film. The layer in contact with the chill roll is termed "lower outer layer".

The spin speed of the chill roll can be adjusted so as to provide films of the desired thickness.

In general, the thickness of the films ranges from 10 to 50 µm, preferably from 20 to 40 µm and more preferably from 23 to 35 µm.

The films obtained by the process described above may also have layers additional to the layers (A) and (B) described above. The said additional layers may be identical in composition to the layer (A) or the layer (B), or alternatively they may be different from either (A) or (B).

A particularly preferred aspect of the present invention relates to films consisting of two layers, (A) and (B) as defined above, being it possible for these layers to be present in the film in different ratios. Generally, the weight ratio between the two layers is between 20:1 and 1:20, preferably between 10:1 and 1:10.

Another aspect of the present invention consists of films with a structure of the type AAB, in which the layers A comprise the components (i) and, preferably, also the components (ii), while the layer (B) comprises the heterophasic compositions defined above. Preferably, the layer B is the lower outer layer.

A further aspect of the present invention consists of cast stretchable multilayer films with a structure of the type ABA, in which between the two outer layers A is placed an intermediate layer B.

Preferably, the outer layers A comprise the components (i), (ii) and optionally the component (iii) as defined above, while the inner layer B comprises the fractions (a) and (b), more preferably the fractions (a1), (a2) and (b) as defined above.

The various layers (A) and (B) can be present in variable amounts relative to the total weight of the film. Preferably, each of the two outer layers is present in amounts generally ranging from about 5 to about 45% relative to the total weight of the film. More preferably, each outer layer is present in amounts of between 10 and 30%. The two outer layers are preferably present in equal parts.

According to that which has been mentioned above, the films of the present invention are characterized by excellent mechanical properties in terms of puncture strength, tensile modulus and load and elongation at yield, and in particular by an excellent retention of mechanical properties after they have been subjected to pre-drawing.

As demonstrated by the examples given, their combination of properties is also surprisingly better than that displayed by films obtained from conventional LLDPE modified with 1-octene. It is moreover surprising that certain properties can be selectively improved, relative to those of films of the type AAA obtained from compositions (i)+(ii) alone, by appropriately selecting the position of the layer (B) in the films of the present invention.

The weight ranges described for the components present in the layers of the films of the present invention refer to the relative weight ratios of the components (i), (ii), (iii), (a) [or (a1) and (a2)] and (b). Obviously, in accordance with what is known by those skilled in the art or as may readily be determined by routine tests, further polymeric components, additives (such as, for example, adhesives, stabilizers, antioxidants, anti-corrosion agents, etc.) and fillers, of either organic or inorganic nature, that are capable of imparting specific properties to the films of the invention may be added. Residues obtained by trimming the films produced may also be among the various components which may be added. The said residues are generally reintroduced in the central extruder.

The examples which follow are given by way of illustration of the invention, without any limitation thereof being implied.

EXAMPLES

The properties indicated were determined according to the following methods:

Composition of the polymers: weight percentage of the various monomers determined by I.R.;

Insolubility in xylene: 2 g of polymer are dissolved in 250 $cm^3$ of xylene at 135° C. with stirring. After 20 minutes the solution is left to cool with continued stirring until it reaches a temperature of 25° C. After 30 minutes the insoluble polymer precipitated is separated out by filtration. The solvent is removed from the solution by evaporation under a stream of nitrogen and the residue is dried under vacuum at 80° C. until the weight remains constant. In this way, the percentage of polymer soluble in xylene at 25° C. is calculated and, consequently, the percentage of insoluble polymer is determined;

Heat of fusion: ASTM D 3418-82;

Density: ASTM D 1505;

Melt Index E (MIE): ASTM D 1238, condition E;

Melt Index F (MIF): ASTM D 1238, condition F;

Melt Index L (MIL): ASTM D 1238, condition L;

F/E: ratio between melt index F and melt index E;

Elmendorf Tear Strength: ASTM D 1922, determined both in the direction of the machine (MD) and in the transverse direction (TD);

Max. puncture force and maximum puncture deformation: the maximum force (expressed in N) and the deformation of the film (expressed in mm) which are required to perforate a film using a punch with a hemispherical head which penetrates the film at constant speed are measured. The analysis time is 1 hour at a temperature of 23° C.

Equipment

The dynamometer used is of the Instron mod. 4301 type or equivalent. The thickness gauge used is of the Mitutoyo type or equivalent. The punch used is 50 mm long with a hemispherical head 4 mm in diameter.

Method

A sample of film 50 mm in width and 200 mm in length is placed in a thermostatically-controlled environment at a temperature of 23° C. After placing the film in the sample holder, compression of the punch into the film is started at a speed of 20 mm/minute. The test is repeated at 5 different points on the sample, with a separation of at least 3 mm between each point.

Elongation at yield:: ASTM D 882

Load at yield: ASTM D 882

Tensile modulus: ASTM D 882

The composition (i)+(ii) used in the examples reported was obtained directly by polymerization working in two reactors in the gas phase, as described in international patent application WO 95/20009. The composition comprises 86% of an ethylene/1-butene copolymer [component (i)] and 14% of a terpolymer of propylene with ethylene and 1-butene having an insolubility in xylene of greater than 70% [component (ii)]. The resulting composition has an MIE of 2 and a relative density of 0.912.

The composition used in the layers (B) consists of about 49% of a fraction which is insoluble in xylene, containing a propylene/ethylene copolymer containing about 3% ethylene [component (a)] and about 51% of a fraction which is soluble in xylene, containing an ethylene/propylene copolymer containing about 30% ethylene [component (b)].

The low density polyethylene (LDPE) used in the examples is marketed by Enichem under the name Riblene FL30 and has a relative density of 0.924 and a MIE of 2.1.

The LLDPE polyethylene used in the examples is an ethylene/octene copolymer with a MIE of 2.2 and a relative density of 0.917, marketed by Dow under the name Dowlex, grade 2247 E.

The VLDPE polyethylene used in example 10 is marketed by Enichem under the name Clearflex CLBO and has density of 0.911 and a MIE of 3.

Example 1

A stretchable multilayer film of the ABA type with a thickness of about 30 μm was prepared according to the method of coextrusion through a flat head described above, using a Dolci cast film line fitted with two Dolci 70 extruders for the outer layers and a Dolci 120 extruder for the inner layer. The composition of the film is given in Table 1, while the results of the tests to which it was subjected are given in Table 3.

Example 2 (comparative)

A stretchable multilayer film of the AAA type was prepared according to the method and with the apparatus described in Example 1. The composition of the film is given in Table 1 while the results of the tests to which it was subjected are given in Table 3.

Examples 3–6

Stretchable multilayer films of the ABA type were prepared as described in Example 1. The compositions of the films are given in Table 1 while the results of the tests to which they were subjected are given in Table 3.

Examples 7–8

Stretchable multilayer films of the AAB type with a thickness of about 30 microns were prepared according to the method and with the apparatus used in Example 1. The composition of the film is given in Table 2 while the results of the tests to which they were subjected are given in Table 3.

Example 9 (comparative)

A stretchable multilayer film of the AAA type with a thickness of about 30 microns was prepared according to the method and with the apparatus used in Example 1. The composition of the film is given in Table 2 while the results of the tests to which it was subjected are given in Table 3.

Example 10

A stretchable multilayer film of the ABA type with a thickness of about 30 μm was prepared according to the method of coextrusion through a flat head described above, using a Dolci cast film line fitted with two Dolci 70 extruders for the outer layers and a Dolci 120 extruder for the inner layer. The composition of the film is given in Table 1, while the results of the tests to which it was subjected are given in Table 3.

TABLE 1

|  | Ex. 1 | | Ex. 2 (comp.) | | | Ex. 3 | | | Ex. 4 | | | Ex. 5 | | | Ex. 6 | | |
| --- | --- | --- | --- | --- | --- | --- | --- | --- | --- | --- | --- | --- | --- | --- | --- | --- | --- |
| % of the total film Components | A 20 | B 60 | A 20 | A 20 | A 60 | A 20 | A 20 | B 60 | A 20 | A 35 | B 30 | A 35 | A 45 | B 10 | A 45 | A 35 | B 30 | A 35 |
| (i) + (ii) (%) | 100 | | 100 | 100 | 100 | 100 | 97 | | 97 | 97 | | 97 | 97 | | 97 | | | |
| a + b | | 100 | | | | | | 100 | | | 100 | | | 100 | | | 100 | |
| (iii) (%) | | | | | | | 3 | | 3 | 3 | | 3 | 3 | | 3 | | | |
| LLDPE (%) | | | | | | | | | | | | | | | | 100 | | 100 |

TABLE 2

|  | Ex. 7 | | | Ex. 8 | | | Ex. 9 (comp.) | | |
| --- | --- | --- | --- | --- | --- | --- | --- | --- | --- |
| % of the total film Components | A 20 | A 60 | B 20 | A 20 | A 60 | B 20 | A 20 | A 60 | A 20 |
| (i) + (ii) (%) | 100 | 100 | | 97 | 97 | | | | |
| a + b | | | 100 | | | 100 | | | |
| (iii) (%) | | | | 3 | 3 | | | | |
| LLDPE (%) | | | | | | | 100 | 100 | 100 |

TABLE 3

|  |  | Ex. 1 | Ex. 2 (comp.) | Ex. 3 | Ex. 4 | Ex. 5 | Ex. 6 | Ex. 7 | Ex. 8 | Ex. 9 (comp.) |
|---|---|---|---|---|---|---|---|---|---|---|
| Elmendorf |  |  |  |  |  |  |  |  |  |  |
| MD | N | 1.10 | 1.0 | 0.94 | 0.71 | 0.6 | 1.93 | 1.8 | 1.3 | 2.57 |
| TD |  | 7.8 | 3.26 | 7.84 | 6.00 | 5.6 | 6.00 | 4.3 | 4.36 | 5.56 |
| Max. puncture force | N | 5.7 | 6.2 | 5.5 | 5.6 | 5.8 | 4.9 | 7.0 | 7.1 | 6.0 |
| Puncture deformation | mm | 14.8 | 15.1 | 14.3 | 13.2 | 13.4 | 13.2 | 18.8 | 18.8 | 14 |
| MET 2% dry |  |  |  |  |  |  |  |  |  |  |
| MD | MPa | 118 | 109 | 124 | 118 | 106 | 100 | 113 | 108 | 103 |
| TD |  | 116 | 116 | 130 | 130 | 124 | 106 | 115 | 110 | 101 |
| Load at yield |  |  |  |  |  |  |  |  |  |  |
| MD | MPA | 10 | 8.5 | 11.1 | 10.8 | 10.3 | 9.3 | 9.6 | 8.7 | 7.15 |
| TD |  | 7.9 | 7.8 | 7.9 | 8.2 | 7.4 | 7.2 | 8.2 | 7.2 | 7.1 |
| Elongation at yield |  |  |  |  |  |  |  |  |  |  |
| MD | % | 25.4 | 24.1 | 29.9 | 27.5 | 27 | 25.1 | 25.7 | 25.6 | 20.9 |
| TD |  | 25.4 | 21.5 | 23 | 25.2 | 20.5 | 24.1 | 24.7 | 21.2 | 20.9 |

We claim:

1. Stretchable multiple layer films comprising layers (A) and (B), layer (A) comprising:
   (i) a copolymer of ethylene with one or more α-olefins $CH_2=CHR$, where R is an alkyl radical having from 1 to 10 carbon atoms, this copolymer having a density of between 0.88 and 0.945 g/cm$^3$, a melt index of from 0.1 to 10 g/10', and containing up to 20 mol % of α-olefin $CH_2=CHR$;

layer (B) comprising a polyolefin composition having:
   (a) 20–100 parts by weight of a fraction which is insoluble in xylene at room temperature, comprising a propylene homopolymer or a copolymer of propylene with ethylene and/or another α-olefin $CH_2=CHR^I$, where $R^I$ is an alkyl radical having 2–10 carbon atoms, this fraction containing more than 85% by weight of units derived from propylene; and
   (b) 30–80 parts by weight of a fraction which is soluble in xylene at room temperature, comprising an amorphous copolymer of ethylene with propylene and/or another α-olefin $CH_2=CHR^I$, where $R^I$ has the meaning described above, this fraction optionally containing smaller proportions of a diene and containing more than 15% by weight units derived from ethylene.

2. Films according to claim 1, in which fraction (a) of layer (B) comprises a copolymer of propylene, this fraction containing more than 90% by weight of units derived from propylene.

3. Films according to claim 2, in which fraction (a) of layer (B) comprises a copolymer of propylene with ethylene.

4. Films according to claim 1, in which the amount of fraction (b) of layer (B) is greater than the 30% of the sum of (fraction (a) of layer (B)+fraction (b) of layer (B)), and the intrinsic viscosity of fraction (b) of layer (B) is between 1.5 and 4 dl/g.

5. Films according to claim 4, in which the amount of fraction (b) of layer (B) is greater than the 45% of the sum of (fraction (a) of layer (B)+fraction (b) of layer (B)).

6. Films according to claim 1, in which layer (A) comprises:
   (i) from 80 to 100 parts by weight of a copolymer of ethylene with one or more α-olefins $CH_2=CHR$, where R is an alkyl radical having from 1 to 10 carbon atoms, this copolymer having a density of between 0.88 and 0.945 g/cm$^3$, a melt index of from 0.1 to 10 g/10', and containing up to 20 mol % of α-olefin $CH_2=CHR$; and
   (ii) from 5 to 30 parts by weight of a copolymer of propylene with ethylene and/or one or more α-olefins $CH_2=CHR^I$, where $R^I$ is an alkyl radical having 2–10 carbon atoms, this propylene copolymer containing from 60 to 98% by weight of propylene and having an insolubility in xylene of greater than 70%.

7. Stretchable multilayer films comprising layers (A) and (B), layer (A) comprising:
   (i) a copolymer of ethylene with one or more α-olefins $CH_2=CHR$, where R is an alkyl radical having from 1 to 10 carbon atoms, this copolymer having a density of between 0.88 and 0.945 g/cm$^3$, a melt index of from 0.1 to 10 g/10', and containing up to 20 mol % of α-olefin $CH_2=CHR$;

layer (B) comprising a heterogeneous polyolefin composition having:
   (a1) 10–50 parts by weight of at least one polymer chosen from a propylene homopolymer having an isotactic index of greater than 80, and a copolymer of propylene with at least one comonomer chosen from ethylene and α-olefins of formula $CH_2=CHR$ where R is an alkyl radical containing from 2 to 8 carbon atoms, this copolymer containing at least 85% by weight of units derived from propylene;
   (a2) 5–20 parts by weight of a copolymer containing ethylene, this copolymer being insoluble in xylene at room temperature, and
   (b) 40–80 parts by weight of a copolymer containing 10–40% by weight of units derived from ethylene, 90–60% by weight of units derived from at least one comonomer chosen from propylene and α-olefins of formula $CH_2=CHR^I$ where $R^I$ is an alkyl radical containing from 2 to 10 carbon atoms, and 0–5% of units derived from a diene, this copolymer being soluble in xylene at room temperature and having an intrinsic viscosity of between 1.5 and 4 dl/g;

where the sum of the components (a2) and (b) is between 50 and 90% by weight relative to the heterogeneous polyolefin composition, and the ratio of the amounts of the components (a2)/(b) by weight is less than 0.4.

8. Stretchable films according to claim 7, in which layer (A) comprises a polymer composition comprising:
   (i) from 80 to 100 parts by weight of a copolymer of ethylene with one or more α-olefins $CH_2=CHR$, where R is an alkyl radical having from 1 to 10 carbon atoms, this copolymer having a density of between 0.88 and 0.945 g/cm³, a melt index of from 0.1 to 10 g/10', and containing up to 20 mol % of α-olefin $CH_2=CHR$; and
   (ii) from 5 to 30 parts by weight of a copolymer of propylene with ethylene and/or one or more α-olefins $CH_2=CHR^I$, where $R^I$ is a hydrocarbon radical having 2–10 carbon atoms, this propylene copolymer containing from 60 to 98% by weight of propylene and having an insolubility in xylene of greater than 70%.

9. Films according to claim 8, in which, in layer (A), copolymer (i) is present in amounts of between 85 and 95 parts by weight and has a relative density of between 0.89 and 0.94.

10. Cast films according to claim 9, in which, in copolymer (i), the α-olefin $CH_2=CHR$ is selected from the group consisting of propylene, 1-butene, 1-hexene, 1-octene, and 4-methyl-1-pentene.

11. Cast films according to claim 10, in which, in copolymer (i), the α-olefin CH2=CHR is selected from the group consisting of 1-butene and 1-hexene.

12. Films according to claim 8, in which, in layer (A), copolymer (ii) is present in amounts of between 5 and 20 parts by weight and has a propylene content of between 85 and 96% by weight, an ethylene content of between 2 and 8% by weight, and an α-olefin $CH_2=CHR^I$ content of between 2 and 7% by weight.

13. Films according to claim 12, in which, in copolymer (ii), the α-olefin $CH_2=CHR^I$ is selected from the group consisting of propylene, 1-butene, 1-hexene, 1-octene, and 4-methyl-1-pentene.

14. Films according to claim 13, in which, in copolymer (ii), the α-olefin $CH_2=CHR^I$ is selected from the group consisting of 1-butene and 1-hexene.

15. Stretchable films according to claim 12, in which copolymer (ii) has an insolubility in xylene of greater than 75%.

16. Stretchable films according to claim 12, in which copolymer (ii) has an insolubility in xylene of greater than 85%.

17. Stretchable films according to claim 8, in which the composition comprising copolymers (i) and (ii) is prepared directly by polymerization working in at least two reactors in series.

18. Stretchable films according to claim 8, in which layer (A) further comprises: (iii) from 0.3 to 30 parts of a low density polyethylene LDPE.

19. Films according to claim 7, in which, in layer (B), component (a) is a copolymer of propylene with ethylene or an α-olefin of formula $CH_2=CHR^I$ where $R^I$ is an alkyl radical containing from 2 to 10 carbon atoms, component (a) containing at least 90% by weight of units derived from propylene; and component (b) is an ethylene/propylene copolymer containing from 20 to 40% by weight of ethylene.

20. Films according to claim 1, having thicknesses of between 10 and 50 μ.

21. Films according to claim 20, having thicknesses of between 20 and 40 μ.

22. Films according to claim 21, having thicknesses of between 25 and 35 μ.

23. Cast stretchable films according to claim 7, in which layer (A) comprises (i) from 70 to 95 parts by weight of a copolymer of ethylene with one or more α-olefins $CH_2=CHR$, where R is an alkyl radical having from 1 to 10 carbon atoms, this copolymer having a density of between 0.88 and 0.945 g/cm³, a melt index of from 0.1 to 10 g/10', and containing up to 20 mol % of α-olefin $CH_2=CHR$; and (ii) from 5 to 30 parts by weight of a copolymer of propylene with ethylene and/or one or more α-olefins $CH_2=CHR^I$, where $R^I$ is an alkyl radical having 2–10 carbon atoms, this propylene copolymer containing from 60 to 98% by weight of propylene and having an insolubility in xylene of greater than 70%;
wherein the film is a double-layer film.

24. Films according to claim 23, in which the weight ratio of layers (A) and (B) is between 20:1 and 1:20.

25. Films according to claim 24, in which the weight ratio of layers (A) and (B) is between 10:1 and 1:10.

26. Stretchable multilayer films according to claim 7, comprising 3 layers, in the AAB configuration, each layer (A) having the composition set forth in claim 32, layer (B) having the composition set forth in claim 7.

27. Stretchable multilayer films according to claim 26, wherein each layer (A) comprises:
   (i) from 70 to 95 parts by weight of a copolymer of ethylene with one or more α-olefins $CH_2=CHR$, where R is an alkyl radical having from 1 to 10 carbon atoms, this copolymer having a density of between 0.88 and 0.945 g/cm³, a melt index of from 0.1 to 10 g/10', and containing up to 20 mol % of α-olefin $CH_2=CHR$; and
   (ii) from 5 to 30 parts by weight of a copolymer of propylene with ethylene and/or one or more α-olefins $CH_2=CHR^I$, where $R^I$ is a hydrocarbon radical having 2–10 carbon atoms, this propylene copolymer containing from 60 to 98% by weight of propylene and having an insolubility in xylene of greater than 70%.

28. Stretchable films according to claim 27, wherein each layer (A) further comprises (iii) from 0.3 to 30 parts of a low density polyethylene LDPE.

29. Stretchable films according to claim 26, in which the layer (B) is the lower, outer layer.

30. Stretchable films according to claim 28, in which the layer (B) is the lower, outer layer.

31. Stretchable multilayer films according to claim 1 having a structure of the ABA type, each outer layer (A) having the composition set forth in claim 1, intermediate layer (B) having the composition set forth in claim 1.

32. Stretchable films according to claim 31, wherein one or both outer layers (A) further comprises (iii) from 0.3 to 30 parts of a low density polyethylene LDPE, and wherein inner layer (B) comprises a heterogeneous polyolefin composition having:
   (a1) 10–50 parts by weight of at least one polymer chosen from a propylene homopolymer having an isotactic index of greater than 80, and a copolymer of propylene with at least one comonomer chosen from ethylene and α-olefins of formula $CH_2=CHR$ where R is an alkyl radical containing from 2 to 8 carbon atoms, this copolymer containing at least 85% by weight of units derived from propylene;
   (a2) 5–20 parts by weight of a copolymer containing ethylene, this copolymer being insoluble in xylene at room temperature, and
   (b) 40–80 parts by weight of a copolymer containing 10–40% by weight of units derived from ethylene, 90–60% by weight of units derived from at least one comonomer chosen from propylene and α-olefins of formula $CH_2=CHR^I$ where $R^I$ is an alkyl radical containing from 2 to 10 carbon atoms and 0–5% of units derived from a diene, this copolymer being soluble in xylene at room temperature and having an intrinsic viscosity of between 1.5 and 4 dl/g;

where the sum of the components (a2) and (b) is between 50 and 90% by weight relative to the heterogeneous polyolefin composition, and the ratio of the amounts of the components (a2)/(b) by weight is less than 0.4.

33. Films according to claim 31, in which each of the two outer layers (A) is present in an amount of between 10 and 30% relative to the total weight layers (A)(B)(A).

* * * * *

UNITED STATES PATENT AND TRADEMARK OFFICE
CERTIFICATE OF CORRECTION

PATENT NO. : 6,010,772
DATED : January 4, 2000
INVENTOR(S) : Gianni Perdomi, Claudio Cometto, Emanuele Burgin It is certified that error appears in the above-identified patent and that said Letters Patent is hereby corrected as shown below:

Claim 26, column 12,
Line 21, change "in claim 32," to -- in claim 7 --.

Signed and Sealed this

Second Day of October, 2001

*Attest:*

*Attesting Officer*

NICHOLAS P. GODICI
*Acting Director of the United States Patent and Trademark Office*